United States Patent

Butoi

[11] 4,024,926
[45] May 24, 1977

[54] ENERGY SYSTEM FOR SELF-PROPELLED VEHICLES

[76] Inventor: Aristotel Butoi, 689 Senica Ave., Ridgewood, N.Y. 11227

[22] Filed: Sept. 15, 1975

[21] Appl. No.: 613,187

[52] U.S. Cl. .......................... 180/65 D; 180/66 B
[51] Int. Cl.² ........................................ B60K 25/10
[58] Field of Search ............ 180/65 R, 66 R, 66 B, 180/2, 65 D; 417/231, 233

[56] References Cited

UNITED STATES PATENTS

| | | | |
|---|---|---|---|
| 1,557,570 | 10/1925 | Eckman et al. ............ | 180/65 R X |
| 1,831,983 | 11/1931 | Wheeler ...................... | 180/66 B |
| 3,507,580 | 4/1970 | Howard et al. .............. | 290/1 R X |
| 3,530,356 | 9/1970 | Aronson ...................... | 180/65 R X |
| 3,688,859 | 9/1972 | Hudspeth et al. ........... | 180/66 B |
| 3,861,487 | 1/1975 | Gill ............................ | 180/65 R |
| 3,921,746 | 11/1975 | Lewus ........................ | 417/231 X |

FOREIGN PATENTS OR APPLICATIONS

| | | | |
|---|---|---|---|
| 164,771 | 6/1921 | United Kingdom ............. | 180/66 B |
| 833,791 | 4/1970 | United Kingdom ............. | 180/2 |

Primary Examiner—Joseph F. Peters, Jr.
Assistant Examiner—Milton L. Smith
Attorney, Agent, or Firm—Richard L. Miller

[57] ABSTRACT

An energy system which provides the self-propulsion of a vehicle, wherein the vehicle includes wheels driven by a motor. As the wheels vibrate and bounce due to irregularities in the road surface, the vibrations and bouncing cause a piston to reciprocate within a cylinder to thereby pressurize a fluid. The pressurized fluid drives a mechanical conversion device such as a turbine which in turn operates an electrical generator. The electrical energy produced by the generator charges a battery which in turn drives the motor. The driving force produced by the motor causes the wheels to turn and thereby propell the car. Additional electrical equipment provided as accessories in the vehicle, such as air conditioning, power steering, a heating system, vacuum brakes, etc., can also be coupled to the motor to be driven by the same electrical energy which is generated by the vibration and bounce of the wheels.

5 Claims, 3 Drawing Figures

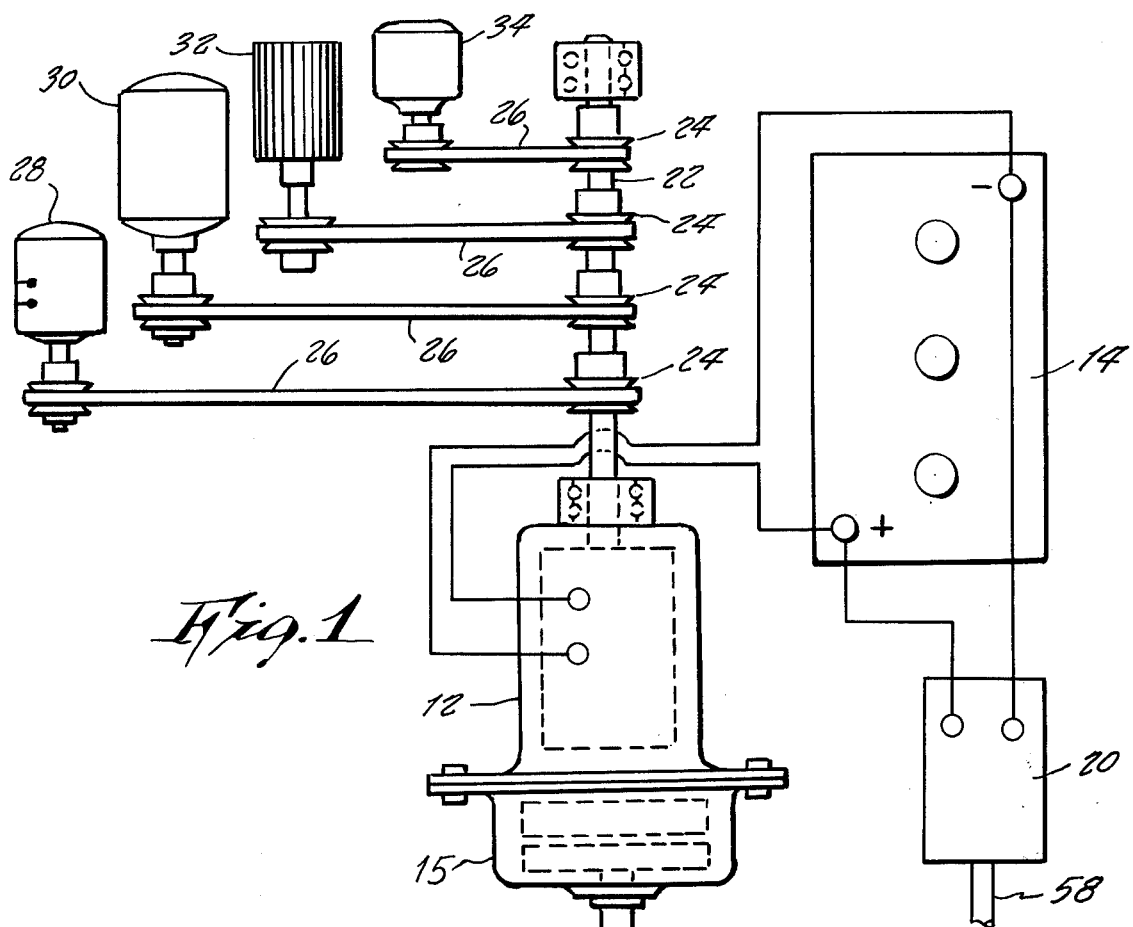
Fig.1
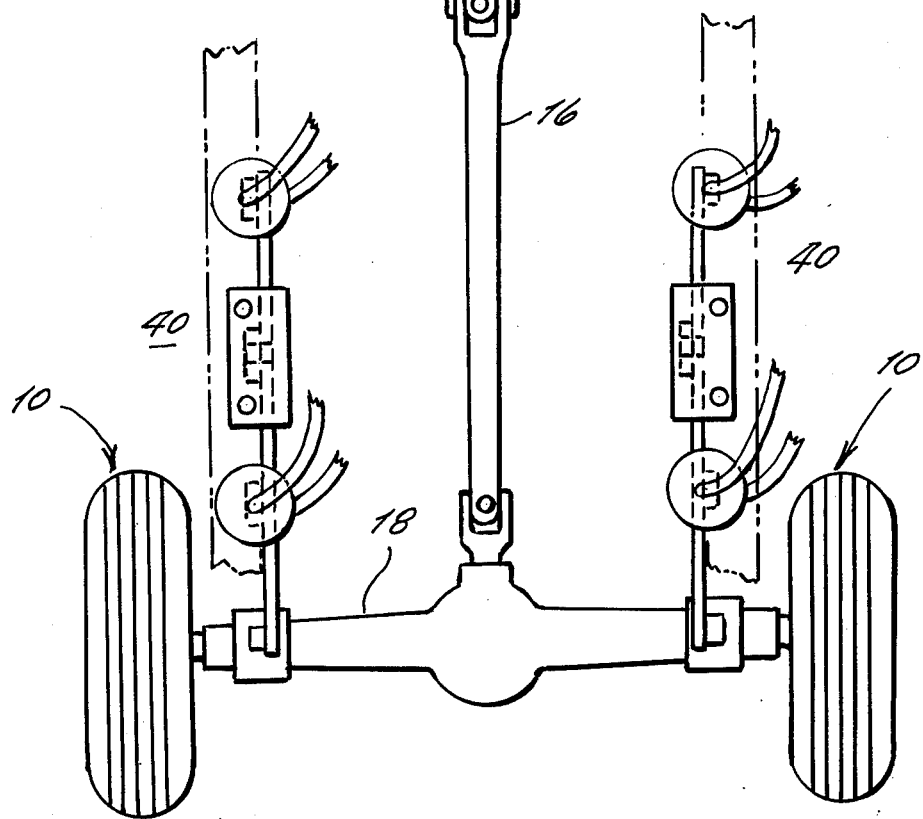

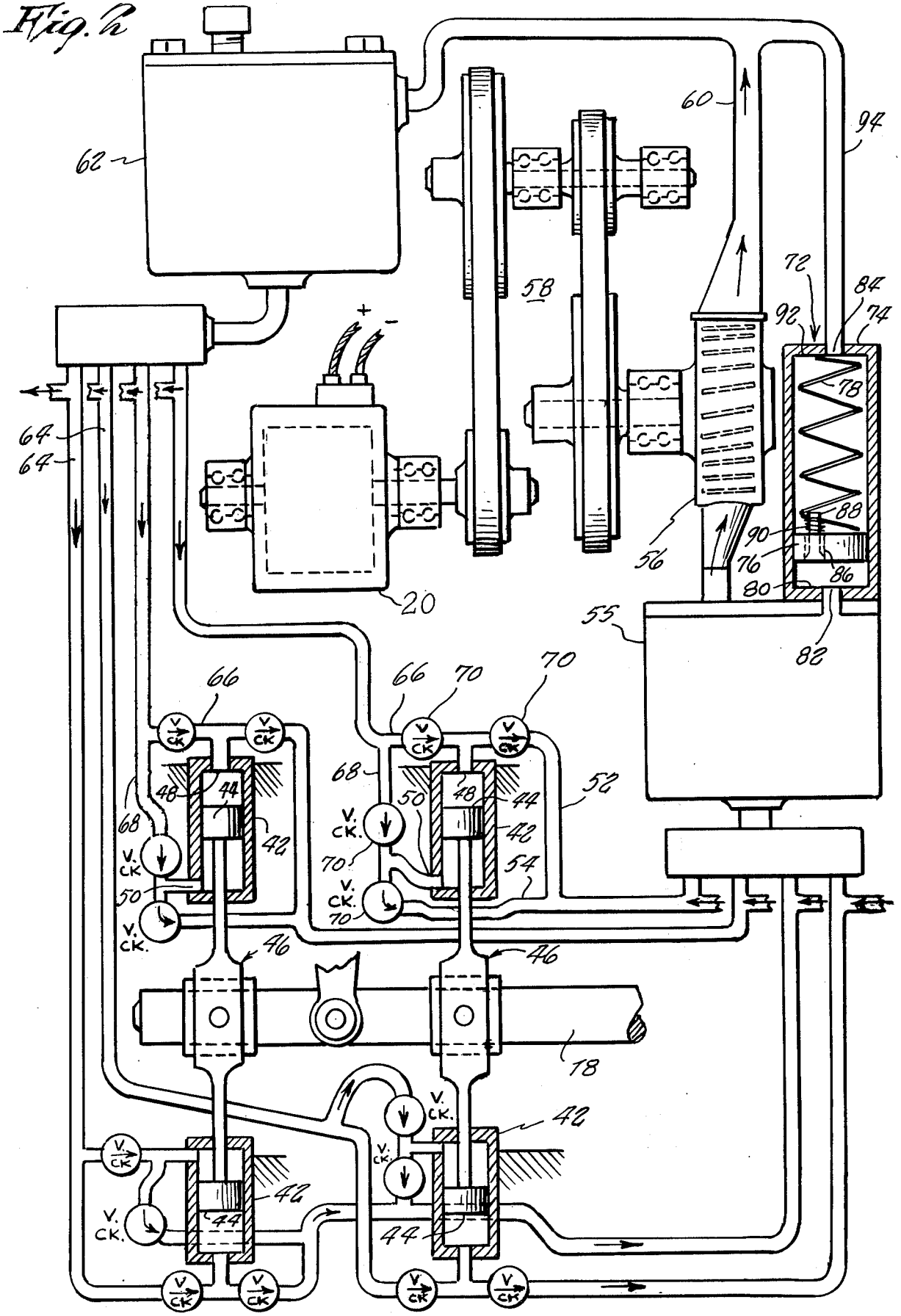

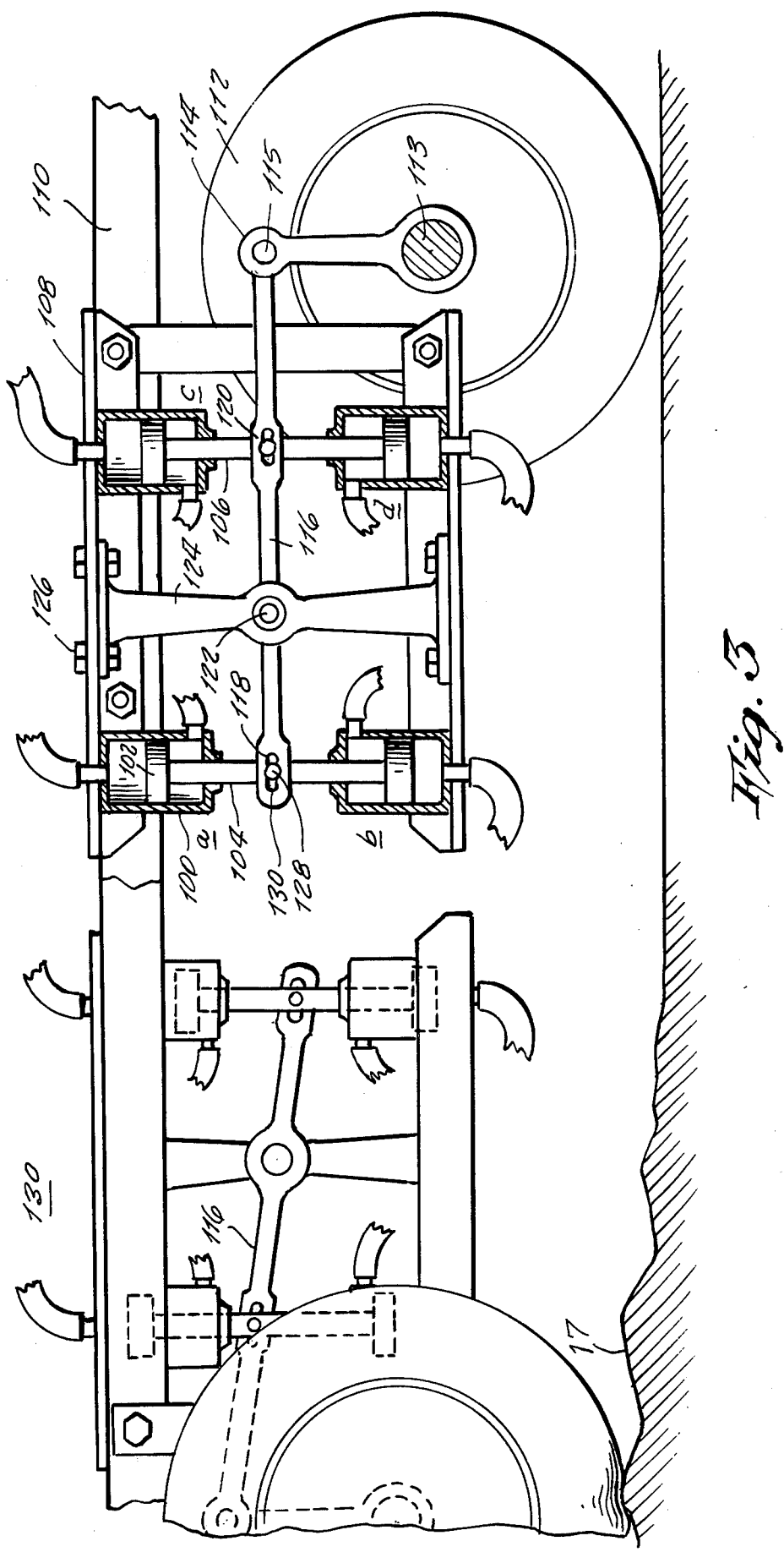

ENERGY SYSTEM FOR SELF-PROPELLED VEHICLES

BACKGROUND OF THE INVENTION

This invention relates to a self propelled vehicle, and more particularly to an energy system for self propelling a vehicle, based upon the vibrations and bouncing of the wheels due to irregularities in the road surface.

Vehicles such as automobiles and motorcycles typically include wheels which are driven by a motor engine. However, the essential part of the vehicle deals with operating the engine. Typical vehicles utilize a fuel, such as gas, which is caused to explode in cylinders and the explosion causes the crank shaft to turn. This approach is utilized in the well known internal combustion engine, the diesel engine, as well as the rotary piston engine.

Such engines utilizing fuel, such as gasoline, produce a great amount of exhaust gas and fumes which tend to pollute the atmosphere. Also, the high cost fuel input makes the operation of the engine very costly. More recently, attempts have been made to provide electric cars which can operate the motor by means of an electrical supply, such as a battery. The charged battery is placed into the vehicle and can operate the motor for a fixed length of time. While such motors may produce less pollutants in the atmosphere, and may not require a gas fuel, to drive the motor, such battery driven vehicles present a great drawback since the batteries must constantly be recharged. Recharging of the batteries has been provided by means of way stations along the road where the electric car can be stopped and plugged in to recharge the battery. However, it is obvious that such systems cannot provide an adequate solution to providing a battery driven vehicle.

Accordingly, it is an object of the present invention to provide an energy system for self propelling a vehicle.

A further object of the present invention is to provide an energy system for a vehicle which utilizes as the source of energy the vibration and bouncing of the wheels due to irregularities in the road surface.

Still another object of the present invention is to provide an energy system for self propelling a vehicle which converts the vibration and bounce of the wheels, caused by irregularities in the road surface, into electrical energy which can drive an electric motor causing the wheels to turn.

Yet a further object of the present invention is to provide an energy system for self propelling a vehicle which can also operate accessory electrical equipment in the vehicle such as air conditioning, power steering, a heating system, vacuum brakes, etc.

Still another object of the present invention is to provide an energy system for self propelling a vehicle which includes a piston and cylinder arrangement associated with each of the wheels of the vehicles for pressurizing a fluid in response to vibrations and bouncing of the wheels caused by irregularities in the road surface.

These and other objects features and advantages of the invention will, in part, be pointed out with particularly, and will, in part, become obvious from the following more detailed description of the invention taken in conjunction with the accompanying drawings which form an integral part thereof.

SUMMARY OF THE INVENTION

Briefly, there is described an energy system for self propelling a vehicle which has at least one wheel driven by a motor. The energy system includes detecting means for responding to vibrations and bouncing of the wheels caused by irregularities in the road surface. A converting means changes the vibrations detected into electrical energy, and a driving means drives the motor utilizing the electrical energy produced.

In one embodiment, a piston and cylinder arrangement is associated with the wheel whereby the piston is caused to reciprocate within its cylinder in response to the wheel vibrations. A pipe supply means interconnects the piston and cylinder arrangement with a turbine means. A fluid is passed within the system. The fluid is pressurized by the reciprocating motion of the piston and under pressure passes through the pipe supply means to cause the turbine to operate. An electrical generator means coupled to the turbine means generates electrical energy in response to the operation of the turbine means.

BRIEF DESCRIPTION OF THE DRAWING

In the FIGS:

FIG. 1 is a fragmentary plan view of the invention assembly;

FIG. 2 is a diagramatic drawing showing the operative system of the present invention, and FIG. 3 is a side elevation view, partly in section, showing the invention installed for the front and rear wheels of a vehicle.

In the various figures of the drawing, like reference characters designate like parts.

DESCRIPTION OF THE PREFERRED EMBODIMENT

Referring now to FIG. 1 there is shown a portion of a vehicle which includes wheels 10 which are driven by means of an electric motor 12. The driving mechanism can typically include an automatic transmission 15 coupled to a drive shaft 16 through which the wheels turn. The wheels are connected by means of the axle 18. The other parts of the vehicle are not shown but are well known in the art. Furthermore, while two wheels are shown, it is understood that some vehicles can include four or more wheels. The motor 12 is driven by means of a source of energy shown as a battery 14. The battery in turn is fed from a generator 20, as will hereinafter be described.

In addition to propelling the vehicle by driving the wheels, the motor 12 can also be used to energize the various accessory electrical equipment contained on the vehicle. There is shown a shaft 22 connected to the motor and a number of drive wheels 24 placed on the shaft. Belts 26 interconnect the shaft with different types of accessory electrical equipment. By way of example, there are shown an air conditioning unit 28, a power steering unit 30, a squirrel cage ventilator forming part of a heating system 32, and a vacuum brake unit 34. Each of these accessories operate from the same motor 12 which drives the vehicle. Since the source of energy for the motor is the battery 14, it is apparent that the battery 14 is utilized both for driving the vehicle as well as for energizing and operating the various electrical equipment thereon.

The power for operating the generator is obtained from piston and cylinder arrangements shown generally at 40, which are interconnected to the wheels of the vehicle to cause the pistons to reciprocate within the cylinders in response to the vibrations and bouncing of the wheels as they pass over irregularities in the road surface. Further details of the piston and cylinder arrangement will be hereinafter described.

Referring now to FIG. 2, there is shown how the system operates, connected to the wheel axle 18 are shown four cylinders 42 each of which contains a piston 44 slidably positioned within the cylinders. By means of a lever system shown generally at 46 the pistons 44 are caused to reciprocate within their respective cylinders 42 as the wheels connected to the axle 18 vibrate and bounce in response to irregularities in the road surface.

Each cylinder contains an opening at either end thereof identified as 48 and 50. An output pipe 52 is connected to the opening 48, and another output pipe 54 is connected to the opening 50. These two output pipes are connected to a reservoir 55. The other end of the reservoir is coupled to a mechanical conversion device such as a turbine 56 which drives electric generator 20 through a series of gears and belts shown generally at 58. Fluid passing through the turbine continues through pipe 60 and feeds an additonal reservoir 62. The output from reservoir 62 passes through the input pipe means 64 which divides up into a first pipe 66 feeding the opening 48 of each cylinder, and a second pipe 68 which feeds the opening 50 of each cylinder. Check valves 70 are placed in each of the pipes 66, 68, 52 and 54 to insure flow therein in a single direction.

The operation of the system is as follows: As the wheels bounce causing the axle 18 to vibrate, the pistons 44 are caused to move either upward or downward in their respective cylinders 42, depending upon the direction of the bounce of the wheel. As the piston moves in one of the directions, it compresses the fluid within the cylinder and forces the pressurized fluid out of one of the passageways 48, 50 depending upon which direction the piston has moved. This action is similar to that provided in a piston type shock absorber. The fluid which passes through the cylinder enters into the output pipe 52 or 54, passing through the check valve. The check valves in lines 66 and 68 prevent the fluid from passing back into the input pipes.

The fluid passes through the output pipes into the reservoir 55 which stores the fluid under pressure. The pressurized fluid then passes into the turbine 56 causing it to rotate by means of the force resulting from the pressurized fluids. After the fluid has passed through the turbine, it continues into pipe 60 and onto the reservoir 62. At this point, the fluid is no longer pressurized but continues to flow because of the fluid behind it and therefore continues into the input pipe 64 and back into the cylinders through pipes 66 and 68.

The fluid thereby forms a closed loop system wherein it flows from the cylinder to turn the turbine, and then returns back to the cylinders. Thus, by way of example, if the piston 44 moves upward in its cylinder 42, the pressurized fluid will flow out of the passageway 48 into the output tube 52. A new supply of fluid will then be permitted to enter through the opposite passageway 50, from the input pipe 68. When the piston moves toward the opposite end, the cylinder will be filled with a new supply of fluid.

The continuous flow of fluid passes through the turbine causing it to operate the generator which generates electricity to recharge the battery which in turn operates the motor to drive the vehicle. As long as the car continues to move and the wheels bounce and vibrate on irregularities 17 of the road surface, the vehicle will continue to be self-propelled and provide a partial recharging of the battery to drive the motor. However, for some roads which are particularly smooth, it may be that there are insufficient amounts of bounce and vibration to charge the battery sufficiently, and it may be necessary to augment the present system by means of an additional energy supply such as an additional battery which can be recharged at regular intervals, or other means. Similarly, the present system can be added to existing internal combustion engines or other types whereby the present system can be utilized to reduce the amount of fuel needed in regular driving. This would greatly increase the efficiency of such standard engines even though they may not be entirely self propelled.

Referring again to FIG. 2, there is further included a safety valve 72 connected between the reservoir 55 and the reservoir 62 which forms a parallel bypass around the turbine. Should there be a great amount of pressure, this valve provides a safety release permitting the pressurized fluid to bypass the turbine and flow directly from the first reservoir 55 to the second reservoir 62. The bypass valve includes a cylinder 74 with a piston 76 slidably engaged therein. The piston is spring biased by means of the spring 78 to remain near the end 80 of the cylinder. A first passageway 82 exists in the input end 80, and a second passageway 84 exists in the output end of the cylinder. A flow passageway 86 is contained within the piston and it is plugged to be in a closed position by means of a spring held plug 88 which has an extension 90 extending from the rear surface thereof and into the cylinder.

It should be understood that the primary purpose of spring 78 is to act as an energy storing device and maintain pressure on the fluid when there is insufficient input from road vibration.

The operation of the safety valve is as follows:

Fluid from the reservoir 55 which is under pressure, presses against the piston 76. However, the spring 78 resists such pressurized fluid and retains the piston 76 within the cylinder. As the fluid pressure increases, however, the pressure of the fluid overcomes the biasing force of the spring and pushes the piston towards the opposite end of the cylinder. At this point, the extension 90 of the plug 86 reaches the rear surface 92 of the cylinder and the cylinder pushes against the spring biasing the plug to thereby open the passageway 86. The pressurized fluid can now pass into the cylinder through opening 82, through the piston 76, the passageway 86, and out of the cylinder through opening 84 back into the pipe 94 which leads into the reservoir 62.

Referring now to FIG. 3, there is shown an embodiment for interconnecting the piston and cylinder arrangements with the wheel. Four piston and cylinder arrangements shown generally as *a*, *b*, *c* and *d*, each contain a cylinder 100 with a piston 102 therein. The four cylinders are arranged at each of four corners of a square configuration. The pistons from the cylinders on either side of the square are interconnected. Thus, the pistons from cylinders *a* and *b* are interconnected by means of the connecting rod 104, and the pistons and cylinders *c* and *d* are interconnected by means of the connecting rod 106. The four cylinders are mounted on a frame 108 and the frame in turn is mounted on the body of the vehicle 110.

The wheel 112 has connected thereto a vertical arm 114 extending upward from the vehicle axle 113. A cross arm 116 is connected to the end of the vertical arm 114, and can rotate at the joint 115. The cross arm 116 is in turn coupled to the connecting rods 104 and 106 in spaced apart relationship at respective connecting points 118 and 120. At approximately the midpoint between the connecting points 118, 120, there is connected a pivot 122 on a cross bar 124 which is securely connected to the frame 108. The bolts 126 which interconnect the cross bar 124 to the frame 108 can also be utilized to connect the frame 108 onto the vehicle body 110. The connecting points 118, 120 contain pins 128 with heads that extend over the cross arm 116. The cross arm in turn contains elongated holes 130 whereby the heads 128 can slide within the holes 130.

In operation, as the wheel bounces on an irregularity in the road, such as a bump, the wheel will move upward or downward. By way of example, if the wheel moves upward, the vertical arm 114 also moves upward. The cross arm 116 is firmly secured in spaced position by the pivot 122 which prevents that point from moving upward or downward. Accordingly, the cross arm 116 will pivot about that point causing the connecting rod 106 to move upward and the connecting rod 104 to move downward. As a result, the pistons in cylinders $a$ and $b$ will move in a downward direction and the pistons in the cylinders $c$ and $d$ will move in an upward direction. It is thus noted that the single movement of the wheel in one direction causes the simultaneous pressurization of liquids in all four cylinders associated with that wheel. The position of the levers when a wheel is on a bounce and moving upward can be seen at the left side of FIG. 3 wherein the wheel and piston section is shown generally at 130. It is noted that the cross arm 116 is at an angular position and that the pistons on the left have moved upward with the pistons on the right moved downward.

Although numerous types of fluids can be utilized, it has been found that oil provides the greatest amount of hydraulic pressure and accordingly the fluid in the system can be oil which passes in a pressurized state to drive the turbine. Although four piston and cylinder arrangements have been shown for each wheel, it is understood that other arrangements could be utilized to make best utilization of the vibrations of the wheel and convert these vibrations into a pressure to drive a turbine.

There has been disclosed heretofore the best embodiment of the invention presently contemplated. However, it is to be understood that various changes and modifications may be made thereto without departing from the spirit of the invention.

What is claimed is:
1. An energy system for self propelling a vehicle having a least one wheel driven by a motor, said energy system comprising; a detecting means for responding to vibrations and bouncing of the wheel caused by irregularities in the road surface, converting means for changing the vibrations and bouncing detected into electrical energy, and driving means for driving the motor from said electrical energy, said detecting means comprising a piston and cylinder arrangement, lever means coupling the piston and cylinder arrangement to the wheel to cause the piston to reciprocate within its cylinder in response to the wheel vibrations and bouncing, said converting means compressing turbine means, pipe output means interconnecting said piston and cylinder arrangement with said turbine means and adapted to contain a fluid, the fluid being pressurized by the reciprocating motion of said piston and then passing through said pipe output means to cause said turbine means to operate, and electrical generator means coupled to said turbine means to generate electrical energy in response to the operation of said turbine means; said driving means comprising battery means for operating the motor, said battery means connected to said generator means for being charged therefrom, and said converting means further comprising first reservoir means interconnected between said pipe output means and said turbine means for storing the pressurized fluid prior to its flow into the turbine means, second reservoir means for storing the fluid flowing out of said turbine means, and input pipe means interconnecting said second reservoir means with said piston and cylinder arrangement for bring fluid into said piston and cylinder arrangement to be pressurized, whereby a closed loop fluid system is formed, and safety valve means directly connected between said first and second reservoir means, whereby excess pressurized fluid can bypass said turbine means and flow directly from said first to said second reservoir means; said safety valve means comprising a cylinder having an input and output end, a piston capable of sliding within said cylinder, biasing spring means holding said piston adjacent said cylinder input end, said piston containing a flow passage transversely therethrough and a spring held plug closing said flow passage, said plug having an end thereof extending from said piston into said cylinder, whereby when sufficient fluid pressure is applied against said piston to overcome said biasing spring, said piston slides through said cylinder to the output end thereof causing the output end of said cylinder to push against the extending end of the plug to thereby open said flow passage.

2. The energy system as in claim 1 and wherein said piston and cylinder arrangement includes four cylinders with respective sliding pistons therein, said four cylinders being arranged in opposing corners of a square configuration, the pistons on either side of the square configuration being coupled together thereby forming two sets of ganged pistons, and wherein said lever means comprises an offset arm extending radially from said wheel, a cross arm having one end thereof rotatably connected to the outer end of said offset arm, said cross arm being coupled in spaced apart relationship to said two sets of ganged pistons, and pivot means connected to said cross arm at about the midpoint between its coupling to said two sets of ganged pistons, whereby as the wheel bounces up and down said cross arm pivots about said mid point causing said two sets of ganged pistons to respectively move in opposing directions within their respective cylinders.

3. The energy system as in claim 2 and further comprising frame means fixed to said vehicle, said four cylinders and said pivot means being fixedly connected to said frame means.

4. The energy system as in claim 1 and wherein said vehicle further comprises electrical equipment including power steering, air conditioning, heating equipment, and vacuum brakes, and further comprising power means for operating said electrical equipment.

5. The energy system as in claim 4 and wherein said power means includes a shaft extending from the engine, and pulley and belt arrangements coupled between said shaft and each of said electrical equipment.

* * * * *